(12) United States Patent
Jung

(10) Patent No.: US 11,893,119 B2
(45) Date of Patent: Feb. 6, 2024

(54) APPARATUS AND METHOD FOR CONTROLLING VEHICLE

(71) Applicants: HYUNDAI MOTOR COMPANY, Seoul (KR); Kia Corporation, Seoul (KR)

(72) Inventor: Ho Jin Jung, Bucheon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 122 days.

(21) Appl. No.: 17/484,646

(22) Filed: Sep. 24, 2021

(65) Prior Publication Data

US 2022/0366053 A1 Nov. 17, 2022

(30) Foreign Application Priority Data

May 14, 2021 (KR) .................. 10-2021-0062373

(51) Int. Cl.
G06F 9/44 (2018.01)
G06F 21/57 (2013.01)
G06F 9/4401 (2018.01)
G06F 21/73 (2013.01)

(52) U.S. Cl.
CPC .......... *G06F 21/575* (2013.01); *G06F 9/4405* (2013.01); *G06F 21/73* (2013.01)

(58) Field of Classification Search
CPC ....... G06F 21/575; G06F 9/4405; G06F 21/73
See application file for complete search history.

(56) References Cited

U.S. PATENT DOCUMENTS

| | | | |
|---|---|---|---|
| 7,506,380 B2 * | 3/2009 | Hunter | G06F 21/575 726/16 |
| 9,779,247 B2 * | 10/2017 | Grimes | G06F 9/4401 |
| 10,177,910 B2 * | 1/2019 | Kinshumann | G06F 11/1433 |
| 2015/0331816 A1 * | 11/2015 | Tokunaga | G06F 9/4812 710/267 |
| 2018/0089435 A1 * | 3/2018 | Zander | G06F 21/575 |
| 2018/0157841 A1 * | 6/2018 | Shin | G06F 21/44 |

* cited by examiner

*Primary Examiner* — Zahid Choudhury
(74) *Attorney, Agent, or Firm* — MORGAN, LEWIS & BOCKIUS LLP

(57) ABSTRACT

A vehicle control apparatus may include a host including a driving application of a vehicle controller and a hardware security module that determines whether to transmit a message for allowing booting of the host to the host, according to a result of a secure boot at an n-th cycle, and determines whether to perform the secure boot at a (n+1)-th cycle, depending on whether the message is transmitted to the host.

18 Claims, 8 Drawing Sheets

| No | HOST VERIFICATION AREA | | | Boot Key | Boot Info. | Boot MAC | VERIFICATION RESULT |
|---|---|---|---|---|---|---|---|
| | RANGE | DETAIL AREA | | | | | |
| FIRST AREA | Bootloader | Booting Sequence Code | | Key A | 0xFF0000 ~ 0xFF4FFF | MAC A | OK/NG |
| SECOND AREA | Bootloader | Reprogramming Code | | Key B | 0xFF5000 ~ 0xFF6FFF | MAC B | OK/NG |
| THIRD AREA | Bootloader | VARIOUS CERTIFICATES AND PUBLIC KEY | | Key C | 0xFF7000 ~ 0xFFFFFF | MAC C | OK/NG |
| FOURTH AREA | Application | APP USING SECURITY KEY (Host → HSM) | | Key D | 0xA00000 ~ 0xB00000 | MAC D | OK/NG |
| FIFTH AREA | Application | GENERAL APP | | Key E | 0xB00001 ~ 0xBFFFFF | MAC E | OK/NG |

FIG.3

| | HOST VERIFICATION AREA | | HOST (APP) OPERATION | | HSM OPERATION | |
|---|---|---|---|---|---|---|
| No. | RANGE | DETAIL AREA | VERIFICATION SUCCESS | VERIFICATION FAILURE | VERIFICATION SUCCESS | VERIFICATION FAILURE |
| FIRST AREA | Bootloader | Booting Sequence Code | NORMAL BOOTING AT (N+2)-TH CYCLE | INFORM USER AT (N+1) CYCLE (NAVIGATION OR THE LIKE) | NO SEPARATE OPERATION | PROHIBIT BOOTING AT (N+2)-TH CYCLE (SYSTEM STOP) |
| SECOND AREA | Bootloader | Reprogramming Code | REPROGRAMMING IS NORMALLY OPERATED | INFORM USER AND PROHIBIT ENTRANCE TO PROGRAMMING SESSION (DELIVER NEGATIVE RESPONSE TO DIAGNOSTIC DEVICE) | NO SEPARATE OPERATION | PROHIBIT BOOTING AT (N+2)-TH CYCLE (SYSTEM STOP) |
| THIRD AREA | Bootloader | VARIOUS CERTIFICATES AND PUBLIC KEY | CERTIFICATES AND PUBLIC KEY | INFORM USER AND PROHIBIT CALLING OF APP USING CERTIFICATE AND PUBLIC KEY | NO SEPARATE OPERATION | PROHIBIT BOOTING AT (N+2)-TH CYCLE (SYSTEM STOP) |
| FOURTH AREA | Application | APP USING SECURITY KEY (Host → HSM) | SECURITY KEY REQUEST IS NORMALLY OPERATED | PROHIBIT NORMAL OPERATION ACCORDING TO OCCURRENCE OF NEGATIVE RESPONSE, WHEN HSM IS REQUESTED | NORMAL RESPONSE OF SECURITY FUNCTION | PROHIBIT USE OF VARIOUS SECRET KEY(SYMMETRIC KEY, PRIVATE KEY, OR THE LIKE) STORED IN HSM AND DELIVER NEGATIVE RESPONSE TO HOST |
| FIFTH AREA | Application | GENERAL APPS | APP FUNCTION IS NORMALLY OPERATED | INFORM USER (NAVIGATION OR THE LIKE) | NO SEPARATE OPERATION | PROHIBIT BOOTING AT(N+2)-TH CYCLE IN CASE OF CRITICAL APPLICATION OR FAILURE HAVING SPECIFIC NUMBER OF TIMES OR MORE (SYSTEM STOP) |

FIG. 4

APPARATUS AND METHOD FOR CONTROLLING VEHICLE

CROSS-REFERENCE TO RELATED APPLICATION

The present application claims priority to Korean Patent Application No. 10-2021-0062373, filed on May 14, 2021, the entire contents of which is incorporated herein for all purposes by this reference.

BACKGROUND OF THE INVENTION

Field of the Invention

The present invention relates to an apparatus and method for controlling a vehicle.

Description of Related Art

As the number of cases that a vehicle controller is hacked has been recently increased, a technology for enhancing the security of a controller is being legally developed. A typical security enhancement technology is used to apply a hardware security module (HSM) to the controller.

The HSM may include a separate secure core and secure Flash/RAM in a vehicle controller to store an encryption key. Besides, the HSM may perform a security function and a crypto algorithm using the encryption key. Furthermore, the HSM supports a secure boot technology. After the HSM is booted first when the vehicle controller is booted, a secure boot verifies the integrity of a controller host, verifies that the controller host has been modified, and allows or prohibits the booting of the controller host.

However, a basic booting time required for the HSM to verify the integrity of the controller host increases. Furthermore, one specific area is verified through an address value of the controller host. When the integrity of the controller host associated with an operation of a vehicle is not verified, the booting of the controller is not allowed, and thus the operation of the vehicle is stopped.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus and method for controlling a vehicle which is configured for shortening a booting time of a vehicle controller and verifying the integrity of a controller host by dividing a specific function and a security function of the controller.

The technical problems to be solved by the present inventive concept are not limited to the aforementioned problems, and any other technical problems not mentioned herein will be clearly understood from the following description by those skilled in the art to which various exemplary embodiments of the present invention pertains.

According to various aspects of the present invention, a vehicle control apparatus may include a host including a driving application of a vehicle controller and a hardware security module (HSM) that determines whether to transmit a message for allowing booting of the host to the host, according to a result of a secure boot at an n-th cycle, and determines whether to perform the secure boot at a (n+1)-th cycle, depending on whether the message is transmitted to the host.

The HSM may transmit the message for allowing the booting of the host to the host and may perform the secure boot at the (n+1)-th cycle when the result of the secure boot at the n-th cycle is successful.

The host may perform the booting after receiving the message.

The HSM may perform the secure boot by dividing a host verification area into a plurality of verification areas.

The HSM may allocate a boot key value, an address value of each of the verification areas, and a boot message authentication code (MAC), which are different for each of the verification areas, and may determine the result of the secure boot for each of the verification areas.

The HSM may store the verification areas, the boot key value for each of the verification areas, the address value of each of the verification areas, the boot MAC, and the result of the secure boot for each of the verification areas in a table.

The HSM may transmit the result of the secure boot to the host.

One or more of the HSM and the host may perform a pre-stored operation in a response to the result of the secure boot for each of the plurality of verification areas when the result of the secure boot is transmitted to the host.

The HSM may not transmit the message for allowing the booting of the host to the host and may not perform the secure boot at the (n+1)-th cycle when the result of the secure boot at the n-th cycle fails.

According to various aspects of the present invention, a vehicle controlling method may include determining whether to transmit a message for allowing booting of a host from a HSM to the host, according to a result of a secure boot at an n-th cycle and determining, by the HSM, whether to perform the secure boot at a (n+1)-th cycle, depending on whether the message is transmitted to the host.

The vehicle controlling method may further include transmitting the message for allowing the booting of the host to the host and performing the secure boot at the (n+1)-th cycle, when the result of the secure boot at the n-th cycle is successful.

The vehicle controlling method may further include performing booting after the host receives the message.

The performing of the secure boot may include performing the secure boot by dividing a host verification area into a plurality of verification areas.

The vehicle controlling method may further include allocating a boot key value, an address value of each of the verification areas, and a boot MAC, which are different for each of the verification areas, and determining the result of the secure boot for each of the verification areas.

The vehicle controlling method may further include storing the verification areas, the boot key value for each of the verification areas, the address value of each of the verification areas, the boot MAC, and the result of the secure boot for each of the verification areas in a table.

The vehicle controlling method may further include transmitting the result of the secure boot to the host.

The vehicle controlling method may further include performing a pre-stored operation in a response to the result of the secure boot for each of the plurality of verification areas when the result of the secure boot is transmitted to the host.

The vehicle controlling method may further include not transmitting the message for allowing the booting of the host to the host and not performing the secure boot at the (n+1)-th cycle when the result of the secure boot at the n-th cycle fails.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 is a diagram schematically illustrating detailed information of a verification area of a secure boot, according to various exemplary embodiments of the present invention;

FIG. 4 is a diagram schematically illustrating operations of a host and an HSM according to a secure boot result, according to various exemplary embodiments of the present invention;

Figure 1:
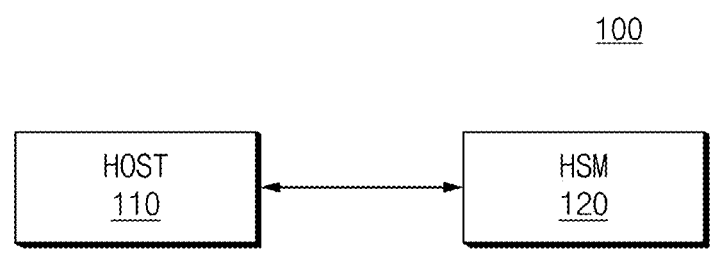
FIG. 1 is a block diagram illustrating a configuration of a vehicle control apparatus, according to various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it may be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to various exemplary embodiments of the present invention, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of a vehicle control apparatus, according to various exemplary embodiments of the present invention.

As shown in FIG. 1, the vehicle control apparatus 100 may include a host 110 and a HSM 120.

The host 110 may include a boot loader and a driving application of a vehicle controller.

The HSM 120 may determine whether to transmit a message for allowing the booting of the host 110 to the host 110, based on a result of a secure boot at an n-th cycle, and then may determine whether to perform the secure boot at an (n+1)-th cycle, depending on whether the message is transmitted to the host 110.

Detailed operations of the host 110 and the HSM 120 will be described with reference to FIG. 2.

Figure 2:
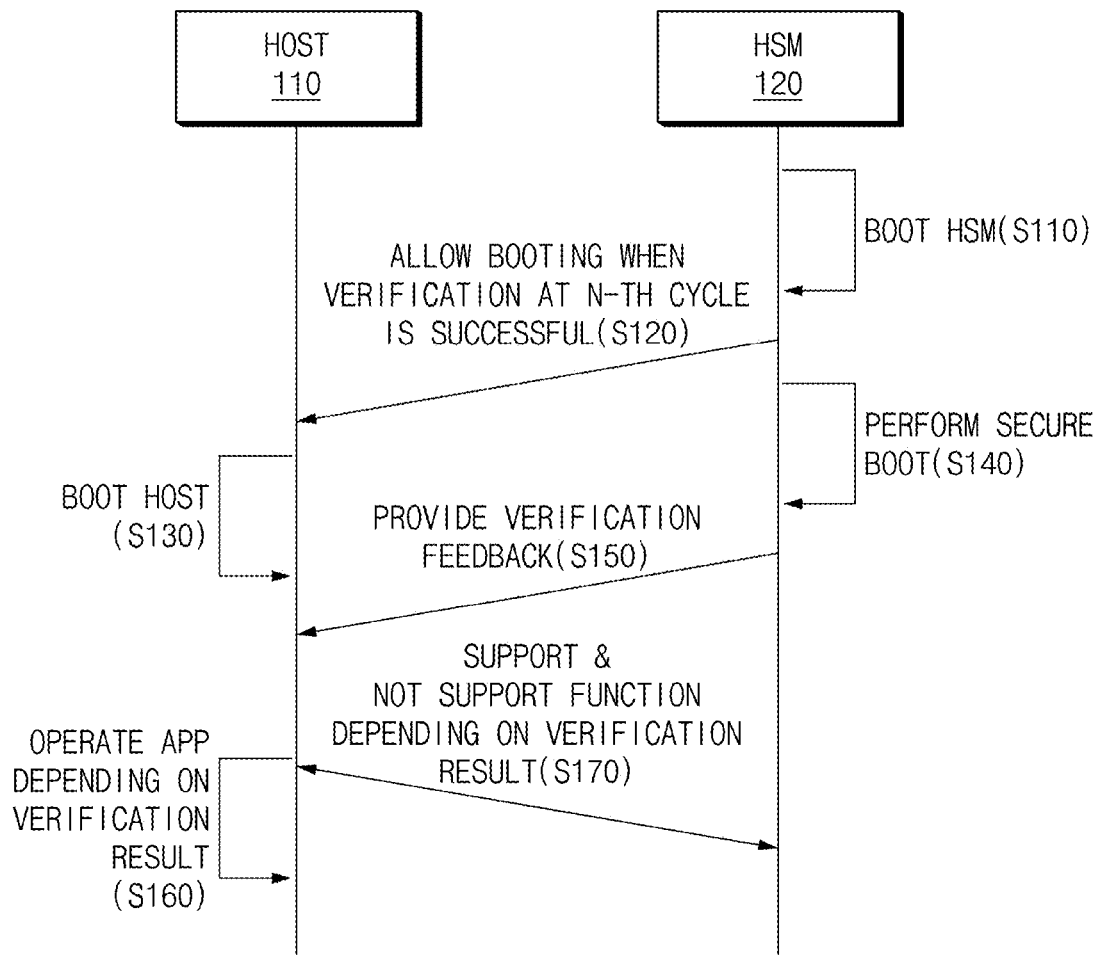
FIG. 2 is a diagram illustrating an operation of a vehicle control apparatus, according to various exemplary embodiments of the present invention.

FIG. 2 is a diagram illustrating an operation of a vehicle control apparatus, according to various exemplary embodiments of the present invention.

As illustrated in FIG. 2, after the HSM 120 is booted (S110), when the integrity of the host 110 is verified through a secure boot at an n-th cycle (i.e., when a result of the secure boot is successful (the integrity verification of the host 110 is successful)), the HSM 120 may transmit a message for allowing the booting of the host 110 to the host 110 (S120). When the host 110 receives the message for allowing the booting, the host 110 may perform booting (S130).

After transmitting the message for allowing the booting of the host 110, the HSM 120 may perform a secure boot (S140). The HSM 120 may transmit the result of the secure boot at the (n+1)-th cycle to the host 110 (S150). The result that the secure boot is successful may mean that the integrity verification of the host 110 is successful. The result that the secure boot fails may mean that integrity verification of the host 110 fails. The detailed descriptions of S140 and S150 will be provided with reference to FIG. 3.

FIG. 3 is a diagram schematically illustrating detailed information of a verification area of a secure boot, according to various exemplary embodiments of the present invention.

As illustrated in FIG. 3, a verification area of secure boot may include a boot loader area and an application area. The boot loader area may be specifically divided into a first area including a boot sequence code, a second area including a reprogramming code, and a third area including various certificates and public keys. Furthermore, the application area may include a fourth area including an application area using a security key and a fifth area including a general application area (e.g., an application that does not use a security key).

The HSM 120 may allocate a different boot key value, a different address value of a verification area, and a different boot message authentication code (MAC) to each of the above-described first to fifth areas, and then may determine the secure boot result for each area. Furthermore, the HSM 120 may store a verification area, a boot key value for each verification area, an address value for the verification area, a boot MAC, and a secure boot result for each verification area in a table of FIG. 3.

When the secure boot result is transmitted to the host 110, the host 110 and the HSM 120 may perform a pre-stored operation in a response to the secure boot result for each of the plurality of verification areas (first to fifth areas) (S160 and S170). The detailed descriptions of S160 and S170 will be provided with reference to FIG. 4.

FIG. 4 is a diagram schematically illustrating operations of a host and an HSM according to an (n+1)-th secure boot result, according to various exemplary embodiments of the present invention.

When the HSM 120 transmits a result of a secure boot at an (n+1)-th cycle to the host 110 in S150, as shown in FIG. 4 according to various exemplary embodiments of the present invention, the host 110 may perform a predetermined operation for each of a plurality of areas (first to fifth areas) in a response to the result of the secure boot.

When the result of the secure boot at the (n+1)-th cycle in the first area is successful, the host 110 may be booted normally at a (n+2)-th cycle. However, when the result of the secure boot at the (n+1)-th cycle in the first area fails, the host 110 may notify a user that the result of the secure boot in the first area fails. According to various exemplary embodiments of the present invention, the host 110 may output the result of the secure boot through a message recognizable by the user. The message may be output visually or audibly through a display device (a display device of a navigation device or a warning light) of a vehicle. Furthermore, when the secure boot result at the (n+1)-th cycle in the first area fails, the HSM 120 does not perform the secure boot at a (n+2)-th cycle in the first area.

When the result of the secure boot at the (n+1)-th cycle in the second area fails, the host 110 may allow reprogramming to operate normally. However, when the result of the secure boot at the (n+1)-th cycle in the second area fails, the host 110 may notify a user that the result of the secure boot in the second area fails. According to various exemplary embodiments of the present invention, the host 110 may output the result of the secure boot through a message recognizable by the user. The message may be output visually or audibly through a display device (a display device of a navigation device or a warning light) of a vehicle.

Moreover, when the result of the secure boot at the (n+1)-th cycle in the second area is successful, the host 110 may prohibit a diagnostic device (a device that diagnoses a state of a vehicle) from entering a programming session. Furthermore, when the result of the secure boot at the (n+1)-th cycle in the second area fails, the HSM 120 does not perform the secure boot at a (n+2)-th cycle in the second area.

When the result of the secure boot at the (n+1)-th cycle in the third area is successful, the host 110 may allow the use of a certificate and a public key. However, when the result of the secure boot at the (n+1)-th cycle in the third area fails, the host 110 may notify a user that the result of the secure boot in the third area fails. According to various exemplary embodiments of the present invention, the host 110 may output the result of the secure boot through a message recognizable by the user. The message may be output visually or audibly through a display device (a display device of a navigation device or a warning light) of a vehicle.

Besides, when the result of secure boot at the (n+1)-th cycle in the third area fails, the host 110 may operate such that it is impossible to call an application using a certificate and a public key. Furthermore, when the result of the secure boot at the (n+1)-th cycle in the third fails, the HSM 120 does not perform the secure boot at the (n+2)-th cycle in the third area.

When the result of the secure boot at the (n+1)-th cycle in the fourth area is successful, the host 110 may operate such that an application requiring a security key request is normally performed. Herein, the security key may include a symmetric key, a private key, and the like, which are stored in the HSM 120. However, when the result of the secure boot at the (n+1)-th cycle in the fourth area fails, the host 110 may notify a user that the result of the secure boot in the fourth area fails. According to various exemplary embodiments of the present invention, the host 110 may output the result of the secure boot through a message recognizable by the user. The message may be output visually or audibly through a display device (a display device of a navigation device or a warning light) of a vehicle.

Furthermore, when the result of the secure boot at the (n+1)-th cycle in the fourth area fails, the HSM 120 may prohibit the use of the security key stored in the HSM 120. Accordingly, as the use of the security key stored in the HSM 120 is prohibited, the host 110 may not operate such that an application requiring the use of a security key is normally performed.

When the result of the secure boot at the (n+1)-th cycle in the fifth area is successful, the host 110 may operate such that a general application (an application that does not require the use of a security key) is normally performed. However, when the result of the secure boot at the (n+1)-th cycle in the fifth area fails, the host 110 may notify a user that the result of the secure boot in the fifth area fails. According to various exemplary embodiments of the present invention, the host 110 may output the result of the secure boot through a message recognizable by the user. The message may be output visually or audibly through a display device (a display device of a navigation device or a warning light) of a vehicle.

Moreover, when the number of times that the result of the secure boot fails exceeds a predetermined number of times, or the secure boot for an application associated with the driving of a vehicle fails because the result of secure boot at the (n+1)-th cycle in the fifth area fails, the HSM 120 does not perform the secure boot at the (n+2)-th cycle in the fifth area.

Accordingly, according to various exemplary embodiments of the present invention, when the result of secure boot fails, a predetermined operation may be performed depending on the secure boot for each verification area instead of stopping all operations of the host 110. Accordingly, the minimum function may be operated and a driver may perceive the result of secure boot.

Figure 5:
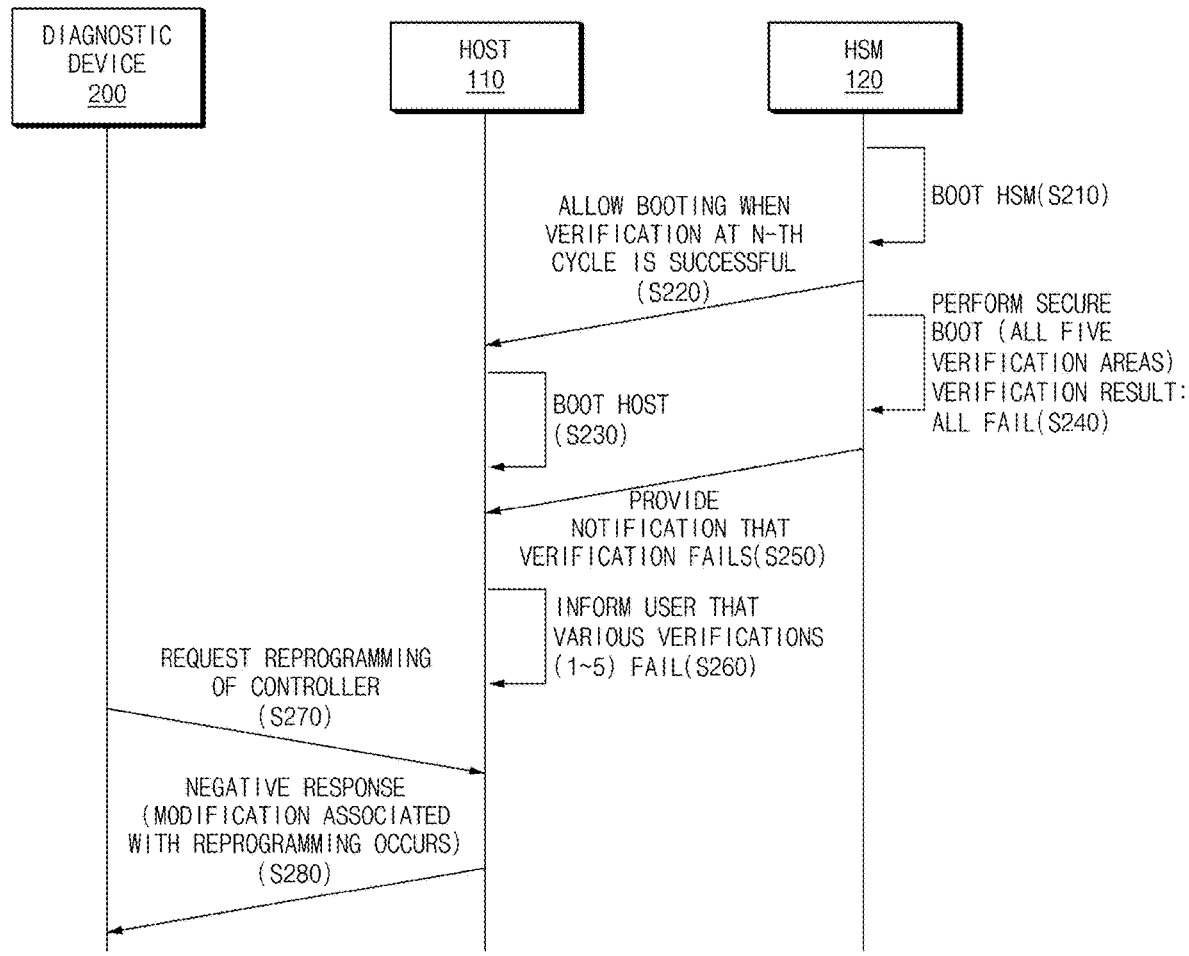
FIG. 5 is a diagram illustrating an operation of a vehicle control apparatus when a secure boot result at an (n+1)-th cycle fails, according to various exemplary embodiments of the present invention.

FIG. 5 is a diagram illustrating an operation of a vehicle control apparatus when a secure boot result at an (n+1)-th cycle fails, according to various exemplary embodiments of the present invention.

As illustrated in FIG. 5, after the HSM 120 is booted (S210), when the integrity of the host 110 is verified through a secure boot at an n-th cycle (i.e., when a result of the secure boot is successful), the HSM 120 may transmit a message for allowing the booting of the host 110 to the host 110 (S220). When the host 110 receives the message for allowing the booting, the host 110 may perform booting (S230).

After transmitting the message for allowing the booting of the host 110, the HSM 120 may perform a secure boot (S240). In S240, the HSM 120 may perform the secure boot in a plurality of areas (first to fifth areas) shown in FIG. 3. When all the results of the secure boot in a plurality of areas fail in S240, the HSM 120 may transmit the result (failure) of the secure boot at an (n+1)-th cycle to the host 110 (S250).

When all the results of the secure boot at the (n+1)-th cycle in the plurality of areas fail, as shown in FIG. 4, the host 110 may inform a user that all the results of the secure boot in the (n+1)-th cycle fails (S260).

When the host 110 receives a request for reprogramming a controller from a diagnostic device (a device configured for diagnosing a state of a vehicle) 200 (S270), the host 110 may generate a negative response and then may prohibit the entrance to a reprogramming session (S280). According to various exemplary embodiments of the present invention, when all the results of the secure boot at the (n+1)-th cycle fail in S260, the host 110 may determine that a bootloader reprogramming code of the host 110 has already been hacked, may generate a negative response code, and may output the negative response code to the diagnostic device 200.

Figure 6:
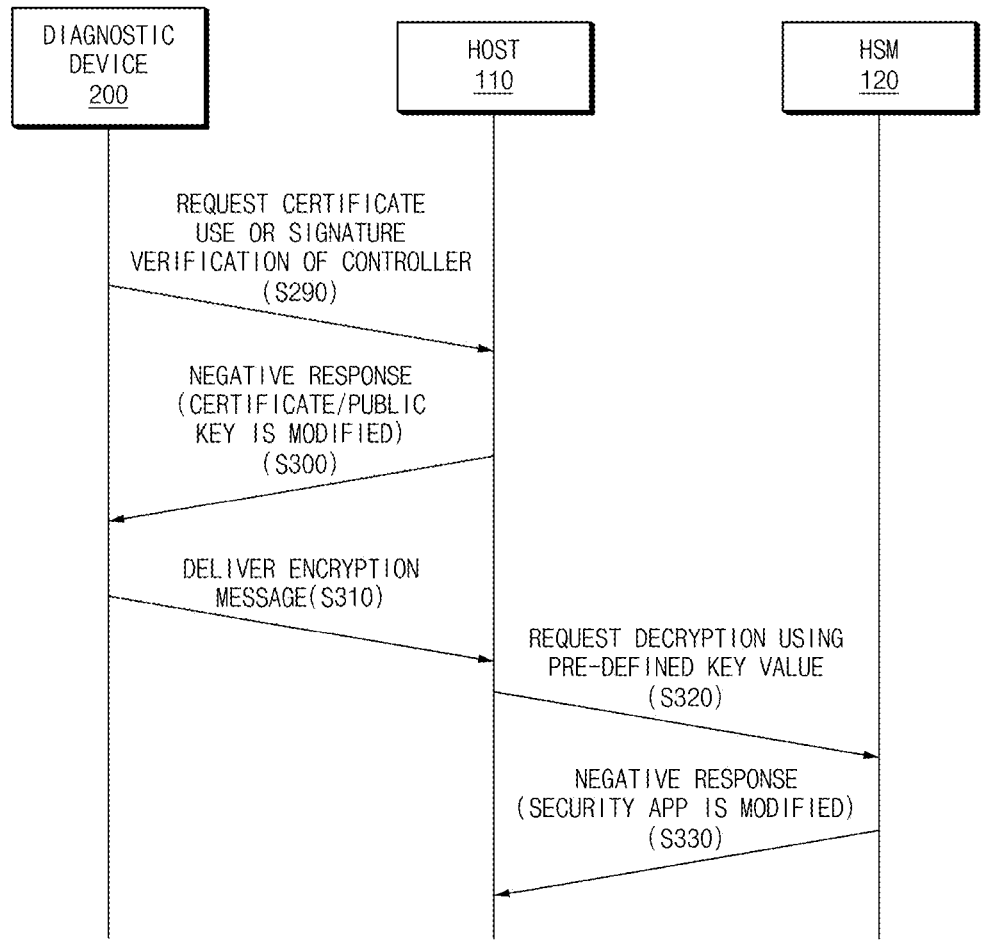
FIG. 6 is a diagram illustrating an operation of a vehicle control apparatus when a secure boot result at an (n+1)-th cycle fails, according to various exemplary embodiments of the present invention.

FIG. 6 is a diagram illustrating an operation of a vehicle control apparatus when a secure boot result fails, according to various exemplary embodiments of the present invention. Operations of FIG. 6 may be performed after S260 of FIG. 5.

As shown in FIG. 6, when the host 110 receives a request for certificate use or signature verification from the diagnostic device 200 (S290), the host 110 may generate a negative response code for prohibiting the calling of an application using a certificate and a public key and may output the negative response code to the diagnostic device 200 (S300).

Furthermore, when the host 110 receives an encryption message from the diagnostic device 200 (S310), the host 110 may make a request for decryption using the security key to the HSM 120 for decryption using a security key stored in the HSM 120 (S320). Because the result of a secure boot fails, the HSM 120 may determine that an application requesting the use of the security key has been hacked or modified, may generate a negative response code, and may transmit the negative response code to the host 110 (S330).

Figure 7:
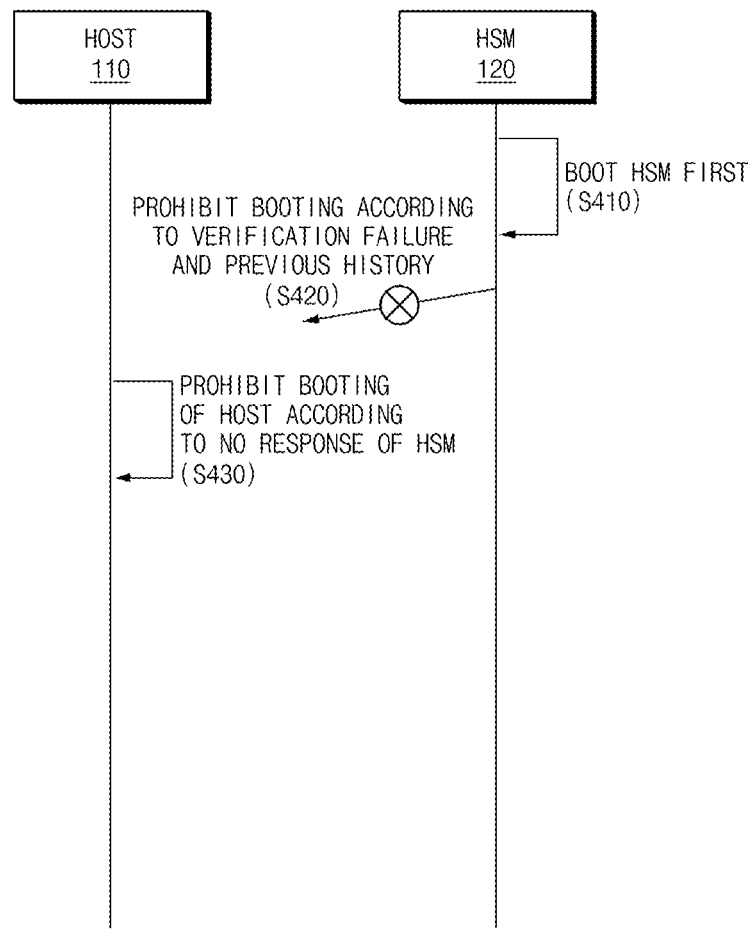
FIG. 7 is a view exemplarily illustrating an operation of a vehicle control apparatus when a secure boot result fails at an n-th cycle, according to various exemplary embodiments of the present invention.

FIG. 7 is a diagram illustrating an operation of a vehicle control apparatus when a secure boot result fails at an n-th cycle, according to various exemplary embodiments of the present invention.

As illustrated in FIG. 7, after the HSM 120 is booted (S410), when the integrity of the host 110 is not verified through a secure boot at an n-th cycle (i.e., when a result of the secure boot fails (the integrity verification of the host 110 fails)), the HSM 120 may not transmit a message for allowing the booting of the host 110 to the host 110, but may prohibit the booting of the host 110 (S420). When the message for allowing the booting of the host 110 is not received, the host 110 does not perform booting (S430). Accordingly, when the secure boot at the n-th cycle fails, the HSM 120 does not perform the secure boot at an (n+1)-th cycle.

Figure 8:
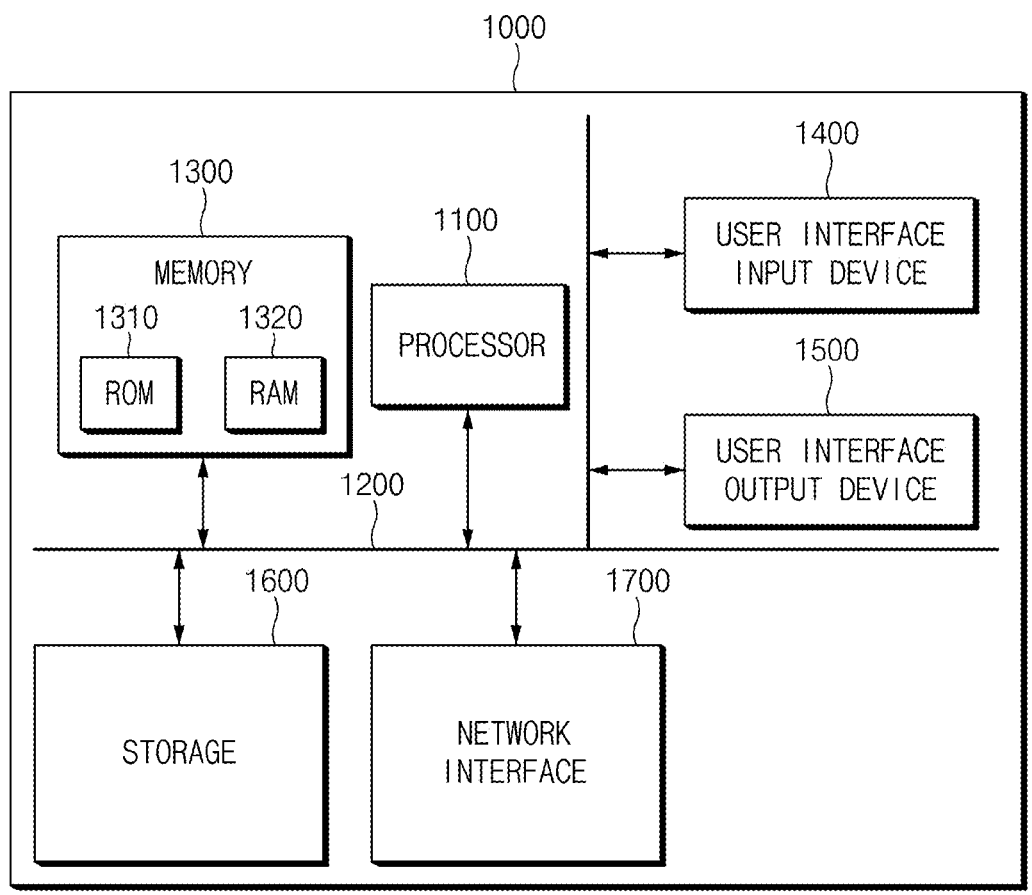
FIG. 8 is a block diagram illustrating a configuration of a computing system performing a method, according to various exemplary embodiments of the present invention.

FIG. 8 is a block diagram illustrating a configuration of a computing system performing a method, according to various exemplary embodiments of the present invention.

Referring to FIG. 8, a computing system 1000 may include at least one processor 1100, a memory 1300, a user interface input device 1400, a user interface output device 1500, storage 1600, and a network interface 1700, which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

Hereinabove, although the present invention has been described with reference to exemplary embodiments and the accompanying drawings, the present invention is not limited thereto, but may be variously modified and altered by those skilled in the art to which various exemplary embodiments of the present invention pertains without departing from the spirit and scope of the present invention claimed in the following claims.

Therefore, the exemplary embodiments of the present invention are provided to explain the spirit and scope of the present invention, but not to limit them, so that the spirit and scope of the present invention is not limited by the embodiments. The scope of the present invention should be construed on the basis of the accompanying claims, and all the technical ideas within the scope equivalent to the claims should be included in the scope of the present invention.

According to various exemplary embodiments of the present invention, an apparatus and method for controlling a vehicle that allows the booting of a vehicle controller host after a HSM is securely booted, reducing a booting time of a vehicle controller. Besides, a verification area is divided during a secure boot, minimizing hacking damages according to each verification area. Furthermore, when the secure boot fails in a specific area of the vehicle controller, a vehicle control apparatus may guide a user, and then may allow the user to perceive and respond to the failure of the secure boot in advance.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle control apparatus comprising:
   a host including a driving application of a vehicle controller; and
   a hardware security module (HSM) configured to determine whether to transmit a message for allowing booting of the host to the host, according to a result of a secure boot at an n-th cycle, and to determine whether to perform the secure boot at a (n+1)-th cycle, depending on whether the message is transmitted to the host,
   wherein the host is configured to notify a user that a result of the secure boot fails when the result of the secure boot at the (n+1)-th cycle fails.

2. The vehicle control apparatus of claim 1, wherein the HSM is configured to transmit the message for allowing the booting of the host to the host and to perform the secure boot at the (n+1)-th cycle when the result of the secure boot at the n-th cycle is successful.

3. The vehicle control apparatus of claim 1, wherein the host is configured to perform the booting after receiving the message.

4. The vehicle control apparatus of claim 2, wherein the HSM is configured to perform the secure boot by dividing a host verification area into a plurality of verification areas.

5. The vehicle control apparatus of claim 4, wherein the HSM is configured to allocate a boot key value, an address value of each of the plurality of verification areas, and a boot message authentication code (MAC), which are different for each of the plurality of verification areas, and to determine the result of the secure boot for each of the plurality of verification areas.

6. The vehicle control apparatus of claim 5, wherein the HSM is configured to store the plurality of verification areas, the boot key value for each of the plurality of verification areas, the address value of each of the plurality of verification areas, the boot MAC, and the result of the secure boot for each of the plurality of verification areas in a table.

7. The vehicle control apparatus of claim 5, wherein the HSM is configured to transmit the result of the secure boot to the host.

8. The vehicle control apparatus of claim 7, wherein one or more of the HSM and the host is configured to perform a pre-stored operation in a response to the result of the secure boot for each of the plurality of verification areas when the result of the secure boot is transmitted to the host.

9. The vehicle control apparatus of claim 1, wherein the HSM is configured to not transmit the message for allowing the booting of the host to the host and is configured to not perform the secure boot at the (n+1)-th cycle when the result of the secure boot at the n-th cycle fails.

10. A vehicle controlling method, the method comprising:
    determining whether to transmit a message for allowing booting of a host from a hardware security module (HSM) to the host, according to a result of a secure boot at an n-th cycle; and
    determining, by the HSM, whether to perform the secure boot at a (n+1)-th cycle, depending on whether the message is transmitted to the host
    wherein the host is configured to notify a user that a result of the secure boot fails when the result of the secure boot at the (n+1)-th cycle fails.

11. The method of claim 10, further including:
    transmitting, by the HSM, the message for allowing the booting of the host to the host when the result of the secure boot at the n-th cycle is successful; and
    performing, by the HSM, the secure boot at the (n+1)-th cycle.

12. The method of claim 10, further including:
    performing, by the host, the booting after the host receives the message.

13. The method of claim 11, wherein the performing of the secure boot includes:
    performing, by the HSM, the secure boot by dividing a host verification area into a plurality of verification areas.

14. The method of claim 13, further including:
    allocating, by the HSM, a boot key value, an address value of each of the plurality of verification areas, and a boot MAC, which are different for each of the plurality of verification areas, and determining, by the HSM, the result of the secure boot for each of the plurality of verification areas.

15. The method of claim 14, further including:
    storing, by the HSM, the plurality of verification areas, the boot key value for each of the plurality of verification areas, the address value of each of the plurality of verification areas, the boot MAC, and the result of the secure boot for each of the plurality of verification areas in a table.

16. The method of claim 14, further including:
    transmitting, by the HSM, the result of the secure boot to the host.

17. The method of claim 16, further including:
    performing, by one or more of the HSM and the host, a pre-stored operation in a response to the result of the secure boot for each of the plurality of verification areas when the result of the secure boot is transmitted to the host.

18. The method of claim 10, further including:
    not transmitting, by the HSM, the message for allowing the booting of the host to the host and not performing, by the HSM, the secure boot at the (n+1)-th cycle when the result of the secure boot at the n-th cycle fails.

* * * * *